United States Patent [19]

McMurtrey

[11] Patent Number: 4,783,187

[45] Date of Patent: Nov. 8, 1988

[54] BICYCLE HANDLEBAR STEM ASSEMBLY

[75] Inventor: David K. McMurtrey, Maysville, Ky.

[73] Assignee: Wald Manufacturing Co., Inc., Maysville, Ky.

[21] Appl. No.: 97,597

[22] Filed: Sep. 16, 1987

[51] Int. Cl.$^4$ ............................................. B62K 21/22
[52] U.S. Cl. ...................................... 403/24; 403/244; 74/551.1; 280/279
[58] Field of Search .................. 403/242, 244, 24; 74/551.1, 551.6; 280/279, 280

[56] References Cited

U.S. PATENT DOCUMENTS

| | | | |
|---|---|---|---|
| D. 280,311 | 8/1985 | Pawsat | D12/117 |
| 4,322,087 | 3/1982 | Addicks | 280/279 |
| 4,337,962 | 7/1982 | Allen et al. | 280/279 |
| 4,501,435 | 2/1985 | McMurtrey | 280/279 |
| 4,526,491 | 7/1985 | Pawsat | 403/24 |

OTHER PUBLICATIONS

Mod. "ITS" Cod. 22.1.022, Italmanubri 1984.
Kusuki Model Win E-11, Japan's Bicycle Guide 1983, p. 167.
Kusuki Model MX-ELF, Japan's Bicycle Guide 1983, p. 168.
Model MT-100, Win Kusuki 1984, p. 5.
Delta Aluminum Corp. Model DMY-90, Taiwan Bicycles & Parts Buyers' Guide, p. 309.
Strong SX-105F, Reverse, SX-105F, Japan'Bicycle Guide 1986, p. 190.
Sakae MTS-101, Japan's Bicycle Guide 1986, p. 184.
Nitto Model V-3, Japan's Bicycle Guide 1986, p. 186.
Kusuki Model MT-100, Japan's Bicycle Guide 1983, p. 169.
Chair Model BMX-155, Japan's Bicycle Guide 1983, p. 171.
Chair Model BMX-140, Japan's Bicycle Guide 1986, p. 188.

*Primary Examiner*—Andrew V. Kundrat
*Attorney, Agent, or Firm*—Wood, Herron & Evans

[57] ABSTRACT

A bicycle handlebar stem assembly for securing a handlebar of a bicycle to a bicycle frame. The stem comprises a top plate, a bottom plate, a barrel and threaded nuts and bolts for securing the bottom plate to the underside of the top plate. The plates have opposed transverse arcuate grooves formed thereon for the reception of a handlebar therebetween. The top plate has a gusset punched upwardly from the underside to define a hole for the reception of the upper end of the barrel. The upper end of the barrel is welded to the top plate by a weld which extends between the side of the gusset, the barrel, and the top side of the top plate. Another weld surrounds the barrel and secures it to the underside of the top plate.

17 Claims, 2 Drawing Sheets

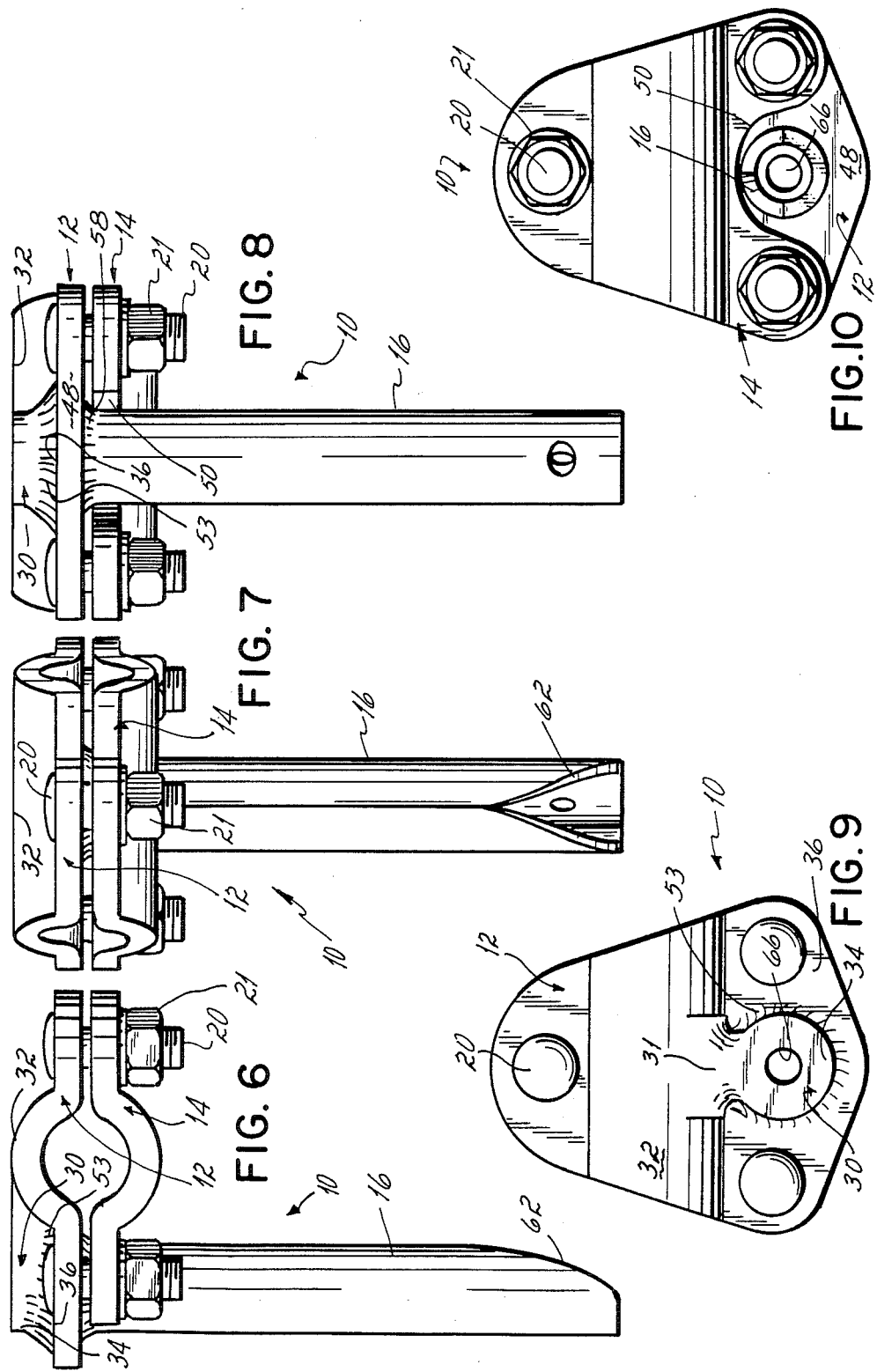

BICYCLE HANDLEBAR STEM ASSEMBLY

This invention relates to bicycles, and more particularly, to an improved handlebar stem for securing the handlebars of a bicycle to the frame.

In recent years, the sport of motocross racing of bicycles has increased in acceptance and popularity. Such racing is conducted over courses having many sharp turns, bumps, jumps and grades and other obstacles. Consequently, every element of a bicycle employed for such racing must be very strong and durable.

One area or item of a motocross bicycle which is particularly vulnerable to breakage is the handlebar stem assembly which secures the handlebars to the frame. In the course of moving over a motocross course, the front wheel of the bicycle is alternately lifted from the ground by pulling the handlebars upwardly and then returned to the ground as the rider shifts his or her weight rearwardly and then forwardly. Such motion occurs in response to the bicycle's encountering bumps or jumps. As a consequence of such lifting and then return of the front wheel to the ground, the handlebar stem, which secures the handlebars to the frame, is repeatedly subjected to tensile and then compressive forces resulting from the bending moment or torque transferred to the stem via the loads applied to the handlebar.

The same type of repeated tensile and compressive loads are encountered on free-style bicycles wherein the rider performs wheelies by lifting the front wheel off the ground by pulling rearwardly on the handlebar, then rides the bicycle on the rear wheel only, and then returns the front wheel to the ground at the end of the wheelie.

To withstand the repated high tensile and compressive forces encountered on both motocross and free-style bicycles, there have been developed special handlebar stems for securing the handlebars of such bicycles to the frame. Such stems are typified by the four-bolt stem illustrated in Pawsat U.S. Pat. No. 4,526,491 and the three-bolt stem illustrated in Pawsat U.S. Pat. Des. No. 280,311. As illustrated in these patents, the handlebar stem of a motocross or a free-style bicycle consists of top and bottom plates which are secured together by nut and bolt connections at the corners of the plates. The plates are formed with opposed arcuate grooves through which the handlebar extends and between which the handlebar is clamped by tightening the bolts which connect the plates. Welded to the bottom plate is a tubular stem barrel which extends downwardly into engagement with the frame of the bicycle. The handlebar stem disclosed in the two above-identified patents both have the barrel of the stem extending at an acute angle to the head or clamping plates of the handlebar stem. There is currently a need for a new free-style or motocross bicycle handlebar stem wherein the head of the stem extends approximately perpendicular to the stem barrel. For various technical reasons, the stems disclosed in the above-identified patents do not lend themselves well to perpendicular orientation of the head of the stem to the stem barrel.

It has therefore been an objective of this invention to provide a bicycle handlebar stem that is durable, attractive, and which may be manufactured relatively inexpensively, but which has the head of the stem located approximately perpendicular to the stem barrel.

The bicycle stem which accomplishes this objective comprises a top plate and a bottom plate, each formed with opposed arcuate grooves between which a handlebar is clamped. The top plate has a gusset punched upwardly from the underside thereof such that the gusset extends from the arcuate curved portion of the top plate out over the top surface of the top plate and generally parallel to the top surface. A stem barrel extends upwardly through the hole created in the top plate by punching the gusset upwardly therefrom. The top end of the barrel is covered by the gusset, and the barrel is welded to the side of the gusset and the top surface of the top plate by a single weld which simultaneously connects the barrel to the side of the gusset and the top surface of the top plate. Another weld between the barrel and the top plate extends around the underside of the top plate.

In the preferred embodiment, the plates are generally triangular in shape and are clamped together by three bolts which extend through three aligned corner holes of the two plates.

The primary advantage of the handlebar stem of this invention is that it is attractive in appearance, as well as durable and relatively inexpensive to manufacture. It also lends itself well to an orientation wherein the barrel of the stem is oriented perpendicular to the plane of the plates of the stem or to being angled in either an upward or downward direction relative to the barrel.

These and other objects and advantages of this invention will be more readily apparent from the following description of the drawings in which:

FIG. 6 is a side elevational view of the bicycle stem of FIG. 1, but with the wedge nut and connecting bolt of the stem removed.

FIG. 7 is a front elevational view of the bicycle stem of FIG. 6.

FIG. 8 is a rear elevational view of the bicycle stem of FIG. 6.

FIG. 9 is a top plan view of the bicycle stem of FIG. 6.

FIG. 10 is a bottom plan view of the bicycle stem of FIG. 6.

Figure 1:
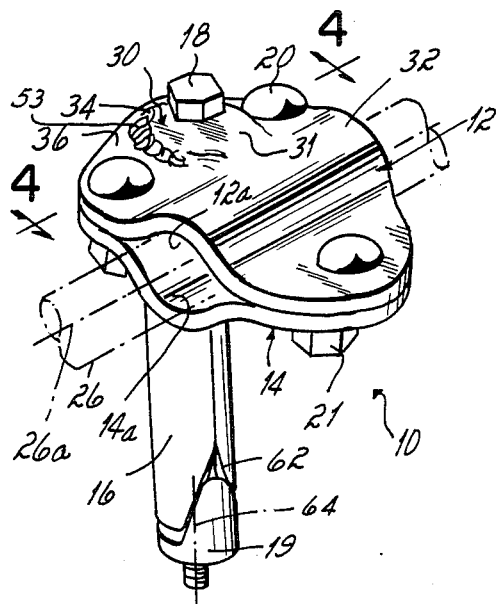
FIG. 1 is a perspective view of a bicycle stem incorporating the invention of this application.
Figure 2:
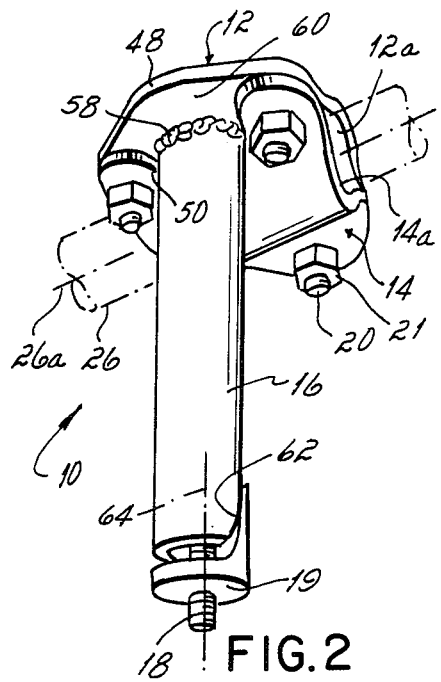
FIG. 2 is a bottom perspective view of the bicycle stem of FIG. 1.

With reference first to FIG. 1, it will be seen that the handlebar stem assembly 10 of this invention comprises a top plate 12, a bottom plate 14, and a stem barrel 16. Additionally, the assembly comprises a bolt 18 which extends vertically through the assembly and is threadably connected at its lower end to a wedge-shaped nut 19. The assembly is completed by three bolts 20 and nuts 21 which connect the bottom plate to the underside of the top plate.

Both the top plate and the bottom plate are generally planar in configuration. Each has a transverse arcuate groove 12a, 14a formed therein. In the use of the stem of this invention, a bicycle handlebar 26 is clamped between these opposed grooves with the centerline 26a of the handlebar colinearly aligned with the centerline of the grooves.

Figure 3:
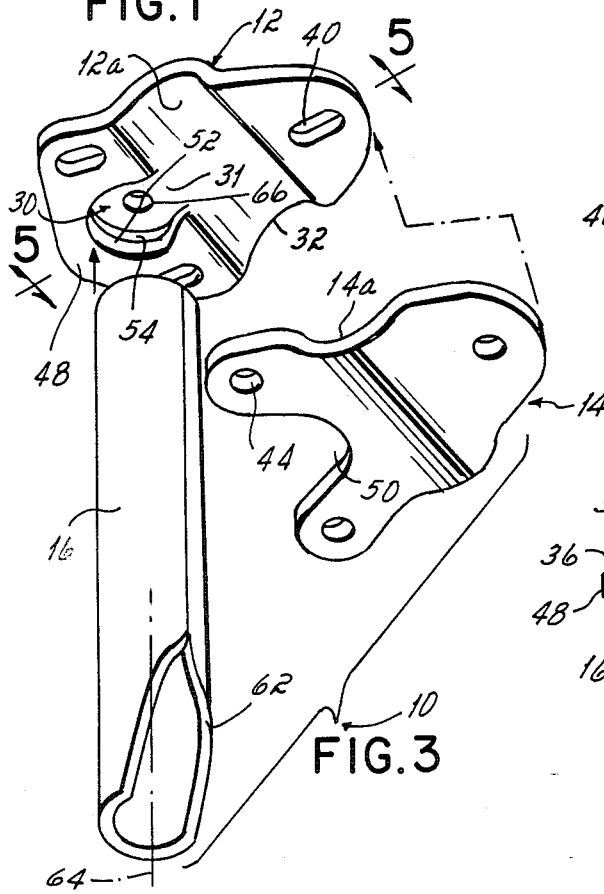
FIG. 3 is a perspective view of the top plate, bottom plate and barrel of the stem of FIG. 1 prior to assembly of those components.
Figure 4:
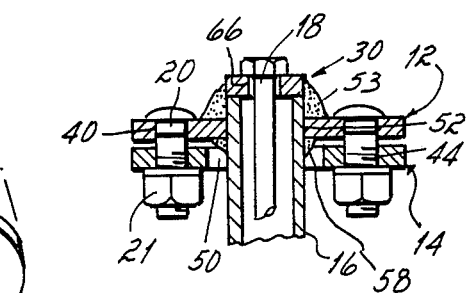
FIG. 4 is a cross-sectional view taken on line 4—4 of FIG. 1.
Figure 5:
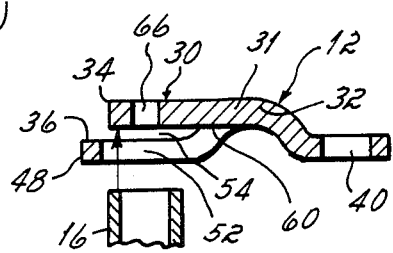
FIG. 5 is a cross-sectional view taken on line 5—5 of FIG. 3.

With reference to FIG. 3, it will be seen that an integral gusset 30 is punched upwardly from the underside of the top plate. This gusset extends outwardly from the raised portion 32 of the plate created by the groove 12a and is connected on one side 31 to the raised portion 32. The opposite end 34 of the gusset extends parallel to, but spaced from, the top surface 36 of the top plate 12.

With reference to FIGS. 1, 3 and 9, it will be seen that the top plate 12 is generally triangular in configuration and has three elongated holes 40 located at each of the three corners thereof. The bottom plate 14 is also generally triangular in shape and has three circular holes 44 at each corner thereof. The holes 44 align with the holes 40 of the top plate when the plates are assembled so as to clamp the handlebar 26 therebetween. The lower plate, rather than having a protrusion 48 on the rear side thereof, has an indentation 50. This indentation is radiused so as to enable the indentation to be received over the circular cross section barrel 16.

The barrel 16, as well as the plates 12 and 14, are all preferably manufactured from sheet metal. The sheet metal from which the barrel 16 is manufactured is formed into a circular, tubular configuration. The barrel is fixedly attached to the top plate 12 by having its upper end inserted through a hole 52 created by the punching of the gusset 30 from the underside of the top plate. When the barrel is placed within this hole, the upper end of the barrel is visible through the space 54 created between the top surface 36 of the top plate 12 and the bottom surface of the gusset 30. In order to secure the barrel to the top plate, a weldment 53 which extends through an arc of approximately 270° is placed around the exterior of the barrel so as to join, with one weld, the side of the gusset 30 and the top side 36 of the top plate 12 to the peripheral surface of the barrel 16. Additionally, a second weldment 58 completely surrounds the barrel 16 and joins the barrel for the circumference thereof to the underside surface 60 of the top plate. Consequently, there are two weldments which secure the barrel to the top plate. One weldment is located between the gusset and the top surface of the top plate 12, and the other is located on the underside of the top plate and joins the underside of the top plate to the circumference of the barrel.

The lower end of the barrel is chamfered, as indicated at 62, so as to form a surface which is tapered relative to the axis 64 of the barrel. This tapered surface 62 cooperates with a tapered surface of the conventional wedge-shaped nut 19 to clamp the lower end of the barrel 16 to the inside of the fork of a conventional bicycle. The nut 19 is threadably connected to the lower end of the bolt 18, the upper end of which passes through a hole 66 punched from the gusset 30.

In the use of the handlebar stem 10, the lower end of the barrel, as well as the wedge-shaped nut 19, are inserted into the open tubular end of the fork of a conventional bicycle. The bolt 18 is then tightened, thereby causing the wedge-shaped nut to be forced radially outwardly so as to clamp the lower end of the barrel onto the interior surface of the tubular upper end of the bicycle fork. A bicycle handlebar is then inserted between the grooves 12a and 14a of the top and bottom plates 12 and 14 and the nuts 21 tightened on bolts 20 so as to securely clamp the handlebar 26 between the top and bottom plates.

It is to be noted that the barrel 16 is oriented in the preferred embodiment of this invention so that its axis 64 is perpendicular to the plane of the top and bottom plates 12 and 14. Manifestly, the gusset 30 could be angled relative to the top plate so as to orient the barrel at either an acute or obtuse angle relative to the top and bottom plates. Additionally, the top and bottom plates 12 and 14 have been illustrated as being generally triangular in configuration. This configuration could also readily be changed to a rectangular shape or to other configurations.

While I have illustrated and described only a single preferred embodiment of my invention, persons skilled in this art will appreciate numerous changes and modifications which may be made without departing from the spirit of my invention. Therefore, I do not intend to be limited except by the scope of the following appended claims.

I claim:

1. A bicycle handlebar stem assembly for securing a handlebar of a bicycle to the frame thereof, said assembly comprising a top plate, a bottom plate, a barrel, and means for securing said bottom plate to the underside of said top plate, said barrel having a top surface, said top and bottom plates both having top and bottom surfaces and a transverse arcuate groove formed therein, said grooves being adapted to receive a bicycle handlebar therebetween, said top plate having a stem assembly strengthening gusset pressed upwardly from the underside thereof to define a receptacle in the bottom surface of said top plate for the reception of the upper end of said barrel, said barrel being located within said receptacle and having the top surface thereof covered by said gusset, said barrel being secured within said receptacle by a welded connection between said barrel and said top plate.

2. A bicycle handlebar stem assembly for securing a handlebar of a bicycle to the frame thereof, said assembly comprising a top plate, a bottom plate, a barrel, and means for securing said bottom plate to the underside of said top plate, said barrel having a top surface, said top and bottom plates both having top and bottom surfaces and a transverse arcuate groove formed therein, said grooves being adapted to receive a bicycle handlebar therebetween, said top plate having a gusset pressed upwardly from the underside thereof to define a receptacle in the bottom surface of said top plate for the reception of the upper end of said barrel, said barrel being located within said receptacle and having the top surface thereof covered by said gusset, said barrel being secured within said receptacle by a welded connection between said barrel and said top plate, and said gusset being punched upwardly from the underside of said top plate, a substantial portion of the bottom surface of said gusset being located above the top surface of said top plate, and said gusset being connected on one side to said top plate, said connection of said gusset to said top plate intersecting said transverse arcuate groove of said top plate.

3. The assembly of claim 2 wherein said welded connection extends between said gusset and the top surface of said top plate.

4. The assembly of claim 3 which further includes a second welded connection which extends between said barrel and the bottom surface of said top plate.

5. The assembly of claim 1 wherein a hole extends vertically through said gusset, a bolt extending through said hole in said gusset and through said barrel, and a wedge-shaped nut threaded onto the said bolt, said wedge-shaped nut being engageable with a tapered surface of said barrel.

6. the bicycle handlebar stem assembly for securing a handlebar of a bicycle to the frame thereof, said assembly comprising
   a top plate, a bottom plate, a barrel, and means for securing said bottom plate to the underside of said top plate,
   said barrel having a top surface,
   said top and bottom plates both having top and bottom surfaces and a transverse arcuate groove formed therein, said grooves being adapted to receive a bicycle handlebar therebetween,
   said top plate having a gusset pressed upwardly from the underside thereof to define a receptacle in the bottom surface of said top plate for the reception of the upper end of said barrel,
   said barrel being located within said receptacle and having the top surface thereof covered by said gusset, said barrel being secured within said receptacle by a welded connection between said barrel and said top plate, and
   said barrel extending generally perpendicular to the plane of said top plate.

7. The assembly of claim 1 wherein said hendlebar receiving grooves have a centerline and said means for securing said bottom plate to the underside of said top plate comprises three apertures in said top plate and three apertures in said bottom plate, said three apertures of said top plate being vertically aligned with said three apertures of said bottom plate, and two of each of said three apertures in each of said plates being located on one side of said centerline and the third aperture of each of said three apertures being located on the opposite side of said centerline, and
   threaded nut and bolt means extending through said three apertures of said plates.

8. The assembly of claim 7 wherein said gusset is located on the same side of said centerline as said two of three apertures of said top plate, and
   said gusset being located medially of said two apertures.

9. A bicycle handlebar stem assembly for securing a handlebar of a bicycle to the frame thereof, said assembly comprising
   a top plate, a bottom plate, a barrel, and means for securing said bottom plate to the underside of said top plate,
   said top and bottom plates both having top and bottom surfaces and a transverse arcuate groove formed therein, said grooves being adapted to receive a bicycle handlebar therebetween,
   said top plate having a stem assembly strengthening gusset punched upwardly from the underside thereof, said gusset being connected on one side to said top plate and on the opposite side extending upwardly above the top surface of said top plate,
   a hole formed in said top plate by the displacement of said gusset from said top plate,
   said barrel having an upper end located within said hole and having a top surface covered by said gusset, and
   said barrel being secured within said hole by a welded connection between said barrel and said top plate.

10. A bicycle handlebar stem assembly for securing a handlebar of a bicycle to the frame thereof, said assembly comprising
    a top plate, a bottom plate, a barrel, and means for securing said bottom plate to the underside of said top plate,
    said top and bottom plates both having top and bottom surfaces and a transverse arcuate groove formed therein, said grooves being adapted to receive a bicycle handlebar therebetween,
    said top plate having a gusset punched upwardly from the underside thereof, said gusset being connected on one side to said top plate and on the opposite side extending upwardly above the top surface of said top plate,
    a hole formed in said top plate by the displacement of said gusset from said top plate,
    said barrel having an upper end located within said hole and having a top surface covered by said gusset,
    said barrel being secured within said hole by a welded connection between said barrel and said top plate,
    said opposite side of said gusset extending generally parallel to said top plate, said gusset having a bottom surface and said top plate having a top surface, and
    a substantial portion of said bottom surface of said gusset being located above said top surface of said top plate.

11. The assembly of claim 10 wherein said gusset intersects said transverse arcuate groove of said top plate.

12. The assembly of claim 10 wherein said welded connection extends between said gusset and said top surface of said top plate.

13. The assembly of claim 12 which further includes a second welded connection which extends between said barrel and the bottom surface of said top plate.

14. The assembly of claim 9 wherein an aperture extends vertically through said gusset, a bolt extending through said aperture in said gusset and through said barrel, and a wedge-shaped nut threaded onto the lower end of said bolt, said wedge-shaped nut being engageable with a tapered surface of said barrel.

15. The assembly of claim 14 wherein said barrel extends generally perpendicular to the plane of said top plate.

16. The assembly of claim 9 wherein said handlebar receiving grooves of said top and bottom plates have a centerline and said means for securing said bottom plate to the underside of said top plate comprises three apertures in said top plate and three apertures in said bottom plate, said three apertures of said top plate being vertically aligned with said three apertures of said bottom plate, and two of each of said three apertures in each of said plates being located on one side of said centerline and the third aperture of each of said three apertures being located on the opposite side of said centerline, and
    said means for securing said bottom plate to said top plate comprises threaded nut and bolt means extending through said three apertures of said plates.

17. The assembly of claim 16 wherein said gusset is located on the same side of said centerline as said two of three apertures of said top plate, and
    said gusset being located medially of said two apertures.

* * * * *